US009687131B2

United States Patent
Eidmohammadi et al.

(10) Patent No.: US 9,687,131 B2
(45) Date of Patent: Jun. 27, 2017

(54) SELF-PROPELLED FLOOR CLEANING DEVICE COMPRISING A CONSECUTIVE VEHICLE, WHICH FOLLOWS A LEAD VEHICLE

(71) Applicant: Vorwerk & Co. Interholding GmbH, Wuppertal (DE)

(72) Inventors: Nazli Eidmohammadi, Goeteborg (SE); Sabrina Hoffmann, Solingen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 182 days.

(21) Appl. No.: 14/687,982

(22) Filed: Apr. 16, 2015

(65) Prior Publication Data

US 2015/0297052 A1  Oct. 22, 2015

(30) Foreign Application Priority Data

Apr. 16, 2014 (DE) .......................... 10 2014 105 460

(51) Int. Cl.
*A47L 11/00* (2006.01)
*A47L 11/40* (2006.01)
*A47L 11/18* (2006.01)
*G05D 1/02* (2006.01)

(52) U.S. Cl.
CPC .......... *A47L 11/4061* (2013.01); *A47L 11/18* (2013.01); *A47L 11/4066* (2013.01); *G05D 1/0225* (2013.01); *G05D 1/0295* (2013.01); *A47L 2201/00* (2013.01); *A47L 2201/02* (2013.01); *A47L 2201/04* (2013.01); *G05D 2201/0203* (2013.01)

(58) Field of Classification Search
None
See application file for complete search history.

(56) References Cited

U.S. PATENT DOCUMENTS 8,918,950 B2* 12/2014 Song .................. A47L 5/225
 15/319
2007/0016328 A1* 1/2007 Ziegler .................. A47L 5/14
 700/245

FOREIGN PATENT DOCUMENTS

| DE | 102 42 257 A1 | 4/2003 |
|---|---|---|
| DE | 10 2008 014 912 A1 | 9/2009 |
| DE | 10 2009 059 217 A1 | 2/2011 |
| DE | 10 2010 000 174 A1 | 7/2011 |
| DE | 10 2010 015 941 A1 | 9/2011 |
| DE | 10 2010 016 553 A1 | 10/2011 |

(Continued)

Primary Examiner — Michael Kornakov
Assistant Examiner — Ryan Coleman
(74) Attorney, Agent, or Firm — Collard & Roe, P.C.

(57) ABSTRACT

A self-propelled floor cleaning device includes a manually controlled or program-controlled first cleaning vehicle, which moves across a treatment path across a surface, which is to be cleaned, including a first cleaning device for carrying out a dry cleaning step. A second cleaning vehicle, including a second cleaning device for carrying out a wet cleaning step, is coupled to the first cleaning vehicle such that the second cleaning vehicle follows the first cleaning vehicle on the treatment path thereof. The second cleaning vehicle can be connected to the first cleaning vehicle via a releasable mechanical coupling. However, it can also be in operative connection with the first cleaning vehicle via only a data transmission path.

13 Claims, 4 Drawing Sheets

(56) References Cited

FOREIGN PATENT DOCUMENTS

DE   10 2013 104 399 A1   10/2014
EP        2 471 426 A2    7/2012

* cited by examiner

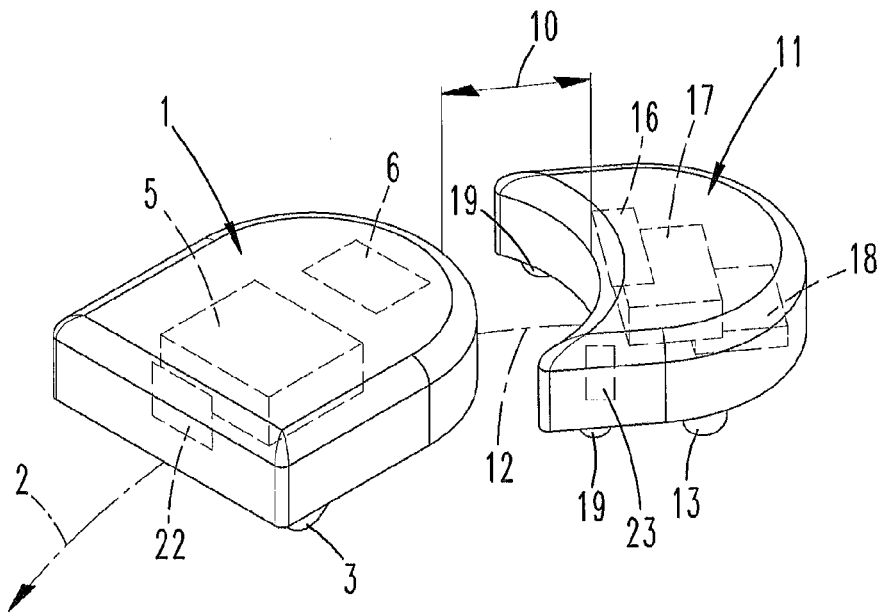
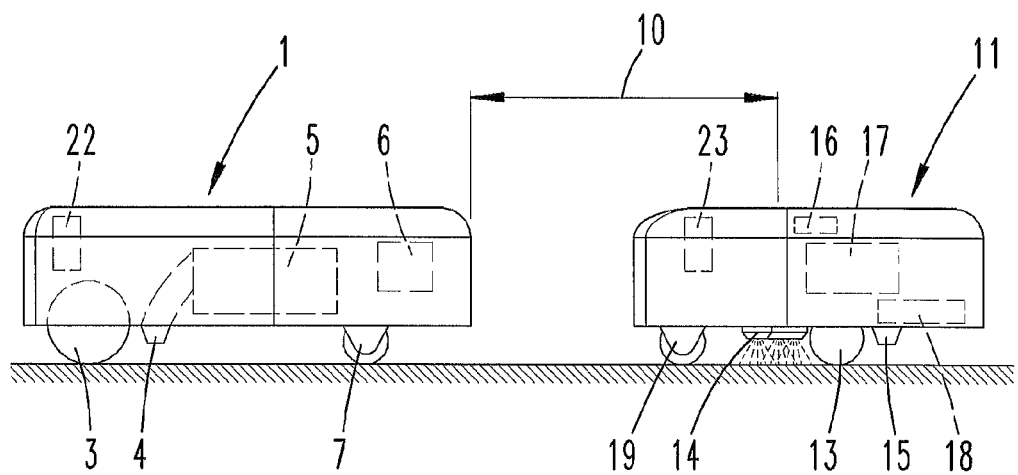

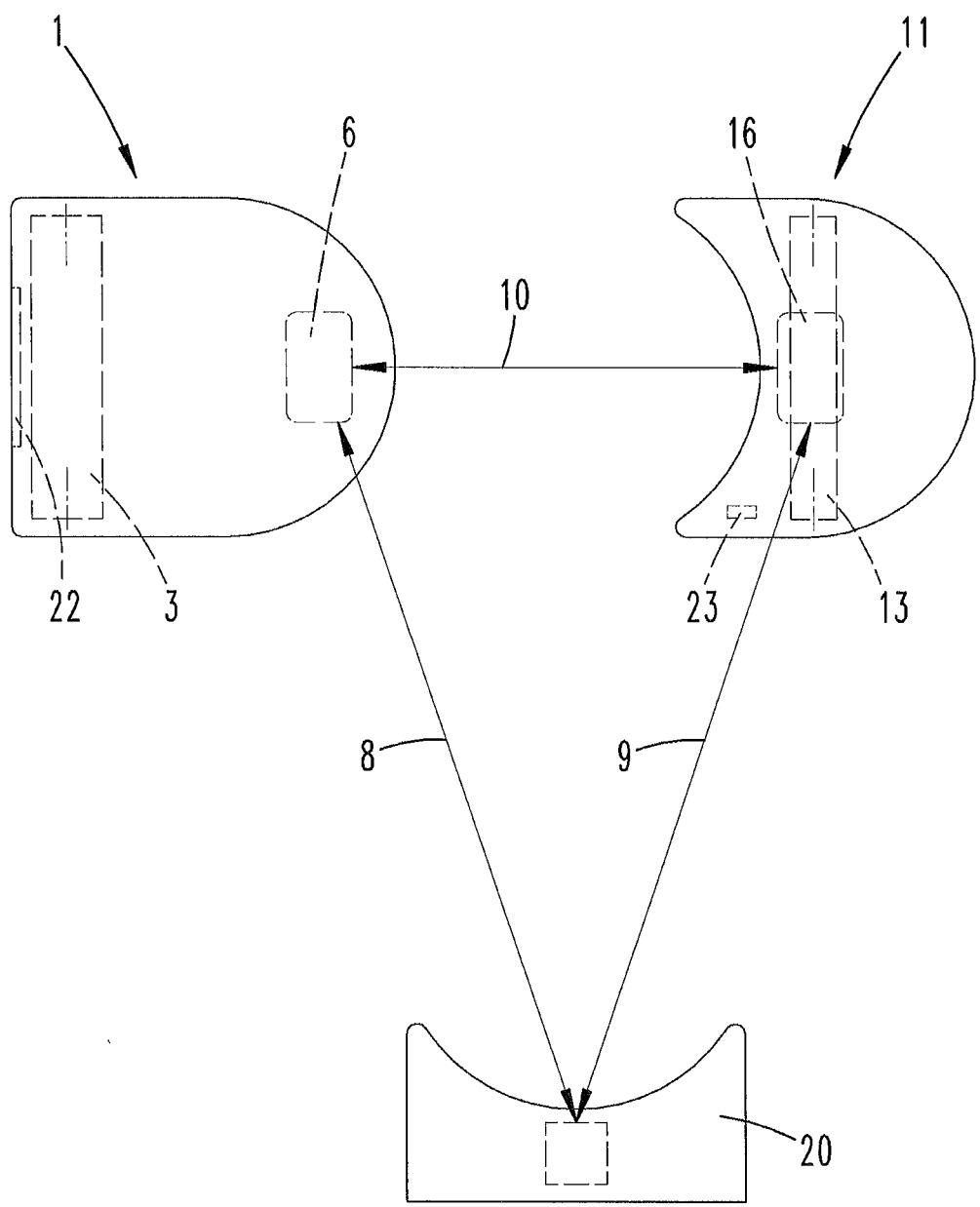

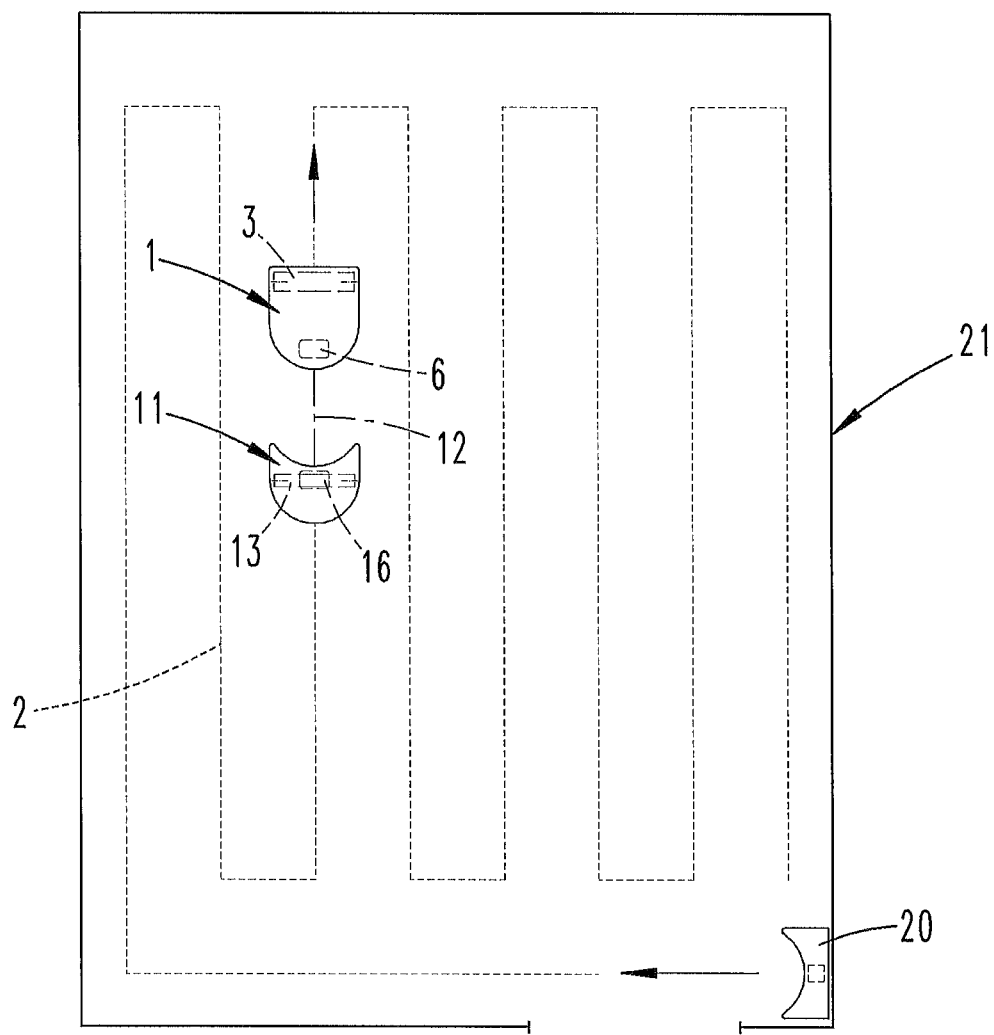

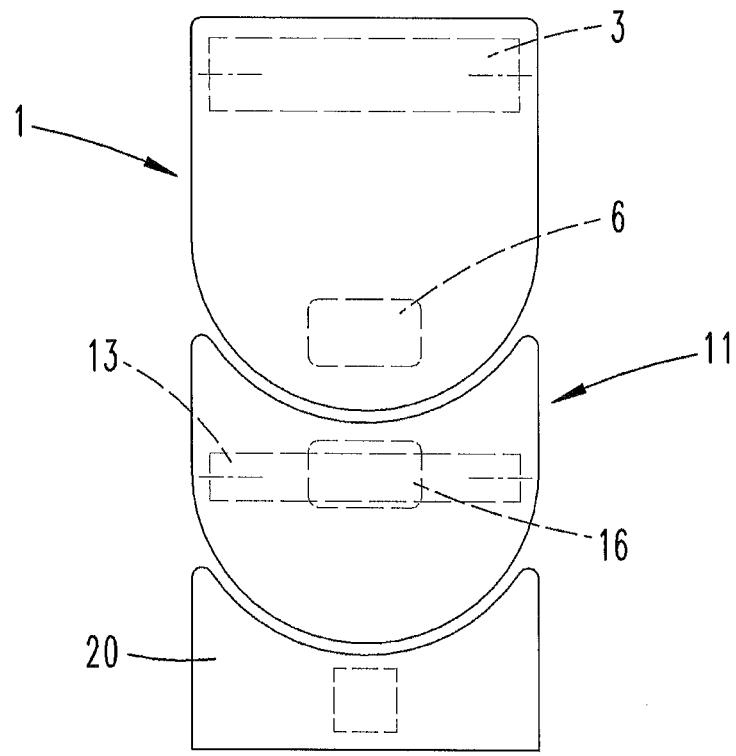
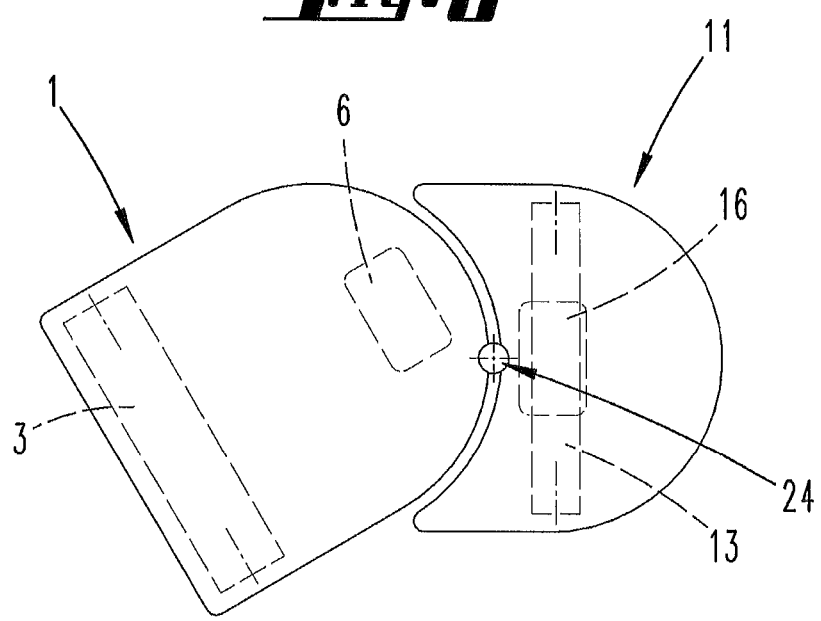

SELF-PROPELLED FLOOR CLEANING DEVICE COMPRISING A CONSECUTIVE VEHICLE, WHICH FOLLOWS A LEAD VEHICLE

CROSS REFERENCE TO RELATED APPLICATIONS

Applicant claims priority under 35 U.S.C. §119 of German Application No. 102014105460.1 filed Apr. 16, 2014, the disclosure of which is incorporated by reference.

BACKGROUND OF THE INVENTION

1. Field of the Invention

The invention relates to a self-propelled floor cleaning device comprising a manually controlled or program-controlled first cleaning vehicle, which moves across a treatment path across a surface, which is to be cleaned, comprising a first cleaning device for carrying out a first cleaning step.

The invention furthermore relates to a method for operating such a cleaning device or a control program, respectively, which is implemented in a control device of the floor cleaning device.

2. Description of the Related Art

A self-propelled floor cleaning device, as it is the starting point of the instant invention, is disclosed by DE 102 42 257 A1. A generic floor cleaning device fulfills the function of a cleaning robot and has a drive unit as well as sensors for detecting the environment, and a control device, which encompasses a computing unit for processing and for generating control instructions. The control instructions are obtained from control defaults. The control defaults can be manually supplied to the floor cleaning device, for example by means of a remote control. However, provision is also made for the control device to be able to orientate itself in a room, which is to be cleaned, and to develop a driving strategy. Methods for orientating a self-propelled floor cleaning device in a room for creating maps and for developing treatment paths on floor surfaces, which are to be cleaned, are known from EP 2 471 426 A2, DE 10 2009 059 217 A1, DE 10 2010 000174 A1, DE 10 2010 015 941 A1, DE 10 2010 016 553 A1 and DE 10 2008 014 912 A1.

SUMMARY OF THE INVENTION

The invention is based on the task of increasing the application spectrum of a self-propelled floor cleaning device and to specify a method, by means of which the cleaning result is improved.

The task is solved by means of the invention, which is specified in the claims. Initially and substantially, the invention proposes a second cleaning vehicle, which encompasses a second cleaning device for carrying out a second cleaning step. The second cleaning vehicle is coupled to the first cleaning vehicle such that it follows the first cleaning vehicle on its treatment path. This can be a releasable mechanical coupling. However, provision is also made for the two cleaning vehicles to be coupled to one another logically/functionally, for example only by means of a data transmission path and in each case to encompass their own drive devices for this purpose. Both cleaning vehicles preferably encompass a control device, which can communicate with one another via said data transmission path or also via a wired data transmission path in the mechanically coupled state. If the two cleaning vehicles are not coupled to one another mechanically, the control device of the second cleaning vehicle is equipped such that the second cleaning vehicle follows the first cleaning vehicle on the treatment path thereof. The consecutive path, on which the second cleaning vehicle moves, thus corresponds at least in sections to the treatment path, on which the first cleaning vehicle moves. The two cleaning steps differ. One cleaning step, preferably the first cleaning step, is a dry cleaning step. For this purpose, the first cleaning vehicle preferably encompasses a dry cleaning device, for example a scrubbing or sweeping unit and/or a suction device. The other cleaning method is preferably a wet cleaning method. For this purpose, in particular the second cleaning vehicle has a wet cleaning device, which is a mopping or a combined suction/mopping device. The second cleaning vehicle thus has a wiping unit, a wetting device and a suction device. The floor surface can be wetted by means of the wetting device by using water, which is carried along in a fresh water tank in the second cleaning vehicle. The mopping unit can carry out a mechanical cleaning. The moisture is extracted via a suction port into a dirty water tank of the second cleaning vehicle. The first cleaning vehicle can encompass sensor elements, by means of which it orientates itself in the room, so as to move across the floor surface, which is to be cleaned, systematically according to a driving strategy. The sensor arrangement is furthermore able to recognize obstacles and to analyze the floor surface. For example, the sensor device is able to differentiate, which sections of the floor surface should only be dry-cleaned and which sections of the floor surface should also be wet-cleaned. Data, thus in particular orientation data, date relating to obstacles and/or data relating to the floor surface, are transmitted to the control device of the second cleaning vehicle via the data transmission path. Based on this data, the second cleaning vehicle is in particular able to follow the first cleaning vehicle, to drive around obstacles, but also to activate and deactivate the second cleaning device, thus the wet cleaning device; when moving across a carpet, for example, a the wet-cleaning is deactivated. The communication between the two cleaning vehicles can take place directly. The wireless, but also wired communication can take place according to a digital standard format. In particular a network protocol is possible. However, the communication between the two cleaning vehicles can also take place indirectly; for example, the base station can perform a relay function. Control defaults are provided in the case of the method according to the invention or in the case of the control program, respectively. The control defaults can be manual control commands, which are provided to the first cleaning vehicle, for example via a remote control. However, the control defaults can also be embodied as algorithm (executable program), which is implemented in the control device. This algorithm is able to create a driving strategy, according to which the first cleaning vehicle moves systematically across the surfaces, which are to be cleaned. The control device of the first cleaning vehicle develops control instructions, by means of which the chassis of the first cleaning vehicle is controlled. A first cleaning step, in particular a dry cleaning step, is carried out on the treatment path, across which the first cleaning vehicle moves, at least in sections. The second cleaning vehicle receives control defaults or second control instructions via the data transmission path. If the second cleaning vehicle receives only control defaults, the control device of the second cleaning vehicle is able to develop second control instructions from these control defaults, according to which the chassis of the second cleaning vehicle is controlled. The control instructions can also relate to the activation or deactivation of the second cleaning device, thus in particular of the wet cleaning device, so that the second cleaning vehicle carries out a second cleaning step on the treatment path at least in sections. If the two cleaning vehicles are operated in mechanical coupling, the data transmitted from the first to the second cleaning vehicle can be limited to information relating to the characteristic of the floor, which is to be cleaned, or can only be switch commands, by means of which the second cleaning device is activated or deactivated, respectively. However, instead of a deactivation of the second cleaning device, provision is also made for the second cleaning vehicle to disengage from the first cleaning vehicle, when the latter moves across a floor area, which is to not be wet-cleaned. After the first cleaning vehicle has cleaned such a floor area, a coupling between the two cleaning vehicles occurs again, so that further floor sections are dry-cleaned and wet-cleaned. If the two cleaning vehicles are coupled to one another mechanically, the two cleaning vehicles couple again. Coupling aids, such as retainers or the like, which make it easier to find the two vehicles, can be used thereby. If, in contrast, the two cleaning vehicles are only coupled logically/functionally, the second cleaning vehicle follows the first cleaning vehicle at a predetermined distance. The distance can be controlled via distance sensors. The two cleaning vehicles can dock together on a base station. The distance of the second cleaning vehicle to the first cleaning vehicle can thereby reduce to zero. One of the two cleaning vehicles is then directly connected electrically to the base station. The electrical connection of the other cleaning vehicle to the base station is made via the cleaning vehicle, which is docked directly on the base station. In the alternative, however, the two cleaning vehicles can also dock on the base station separately from one another. For this purpose, the base station can have two docking positions. The cleaning vehicles can approach these docking positions independently. However, provision can also be made for aids, in particular aids of the base station, with the help of which the cleaning vehicle is maneuvered to the docking position. The latter option offers the advantage that more complex interfaces can also be provided, via which a supply and/or disposal of operating means can be carried out in addition to the charging function for the rechargeable battery. The decrease of the distance of the two cleaning vehicles to zero furthermore makes it possible for the base station to be able to reach around the cleaning vehicle docked on the base station, for example with the help of a pivotable arm, or can reach beyond it, so as to establish a mechanical and electrical contact with the other cleaning vehicle. The rechargeable batteries of the two cleaning vehicles can be recharged in the base station. In the docked state, maintenance can furthermore be carried out. The cleaning vehicles can be cleaned. Cleaning agents, for example cleaning liquids, can be filled up. Provision is made in particular for a dirt container of the first cleaning vehicle and for a dirty water container of the second cleaning vehicle to be emptied at the base station and for a fresh water container of the second cleaning vehicle to be filled with fresh water. It is considered to be advantageous that the second cleaning vehicle uses the control and sensor data of the first cleaning vehicle. It is furthermore considered to be advantageous, if the second cleaning vehicle uses the position data of the first cleaning vehicle. The control electronics of the second cleaning vehicle can be minimized in this manner. It is furthermore advantageous, if the second cleaning vehicle cannot carry out a floor cleaning independently. It is then ensured that a wet-cleaning must always be preceded by a dry-cleaning. It is furthermore advantageous, if only one cleaning vehicle needs to be used in the case of cleaning tasks, for which only a dry-cleaning is to be carried out.

BRIEF DESCRIPTION OF THE DRAWINGS

Exemplary embodiments of the invention will be explained by means of enclosed drawings.

FIG. 1 shows the self-propelled cleaning device, which consists of two individual cleaning vehicles 1, 11 in a schematic manner, comprising a suggested treatment path 2, on which the first cleaning vehicle 1 moves, and a consecutive path 12, on which the second cleaning vehicle 11 follows the first cleaning vehicle 1, FIG. 2 shows a cross section-like illustration of the arrangement according to FIG. 1 for clarifying the components of the cleaning device comprising two cleaning vehicles, FIG. 3 shows a top view-like illustration of the device arrangement in combination with a base station 20, FIG. 4 shows a treatment path 2 in a room 21, which is to be cleaned, in a schematic manner, FIG. 5 shows the cleaning device in a state, in which it is docked on the base station 20, wherein the two cleaning vehicles 1, 11 are illustrated with a small distance to one another so as to be able to better distinguish them. However, provision is made for the cleaning vehicles 1, 11 to touch one another at the curved vehicle edges in the docked state, and FIG. 6 shows a second exemplary embodiment, in the case of which the cleaning vehicles 1, 11 are coupled to one another so as to be mechanically releasable.

DETAILED DESCRIPTION OF PREFERRED EMBODIMENTS

The floor cleaning devices illustrated in the exemplary embodiments consist of a first cleaning vehicle 1 and of a second cleaning vehicle 11. In response to cleaning a floor, the first cleaning vehicle 1 takes over a lead function. It is a lead vehicle, so to speak. The lead vehicle is able to move across a treatment path 2, which is calculated according to a driving strategy, on the floor surface of a room 21, which is to be cleaned. For example, these are the tracks, which run parallel to one another as illustrated in FIG. 4, across which the first cleaning vehicle 1 moves systematically, so as to clean the entire floor surface, which is to be cleaned, in a substantially overlap-free manner.

In the case of the exemplary embodiment, the first cleaning vehicle 1 has a control device 6, in which control instructions for a chassis 7 are generated according to a predetermined algorithm or also according to manual control data. A brush roller 3 is rotatably driven via a non-illustrated electrical drive, which is fed by non-illustrated rechargeable batteries, and a non-illustrated blower for generating an intake flow. Dry dirt particles are loosened from the floor surface by means of the brush roller 3. The loosened dirt particles are transported via a suction channel 4 into a dust collection container 5 by means of a suction air floor, which is generated by the blower.

The second cleaning vehicle 11 has a second cleaning device in the form of a wet cleaning device. A mopping roller 13 is arranged between a wetting device 14 and a suction port 15. The surface, which is to be cleaned, is wetted from a fresh water tank 17 via the wetting device 14. The moisture is extracted into a dirty water tank 18 again by means of the suction port 15.

The second cleaning vehicle 11 has a control device 16, which generates control instructions for a chassis 19 of the second cleaning vehicle 11.

In the case of the exemplary embodiment illustrated in FIG. 6, the two cleaning vehicles 1, 11 are connected to one another via a mechanical coupling 24. In a manner of speaking, the second cleaning vehicle 11 is a trailer of the first cleaning vehicle 1. The mechanical coupling 24 can be released, so that the cleaning vehicle 1 can be operated either followed by the cleaning vehicle 11, or alone.

A possible geometric embodiment of the two cleaning vehicles 1, 11 will be described below:

The first cleaning vehicle 1 has a straight front side and a rear side, which runs along a curved line. The second cleaning vehicle 11 has a curved front side, the course of which corresponds to the curved rear side of the first cleaning vehicle 1. Due to the fact that the rear side of the first cleaning vehicle 1 is designed so as to be convex and the front side of the second cleaning vehicle 11 is designed so as to be concave, the two curved surfaces can be made to rest against one another, in particular in the docked state. The rear side of the second cleaning vehicle 11 runs on a convex curved line. This convex curved line corresponds to a concave curved line of the base station 20, on which either the curved rear side of the first cleaning vehicle 1 or the curved rear side of the second cleaning vehicle 11 can dock. However, other geometric embodiments are also possible, in particular those, which simplify the mechanical coupling of the two devices.

The two cleaning vehicles 1, 11 are separated from one another mechanically in the case of the exemplary embodiment illustrated in FIGS. 1 to 5. The two cleaning vehicles 1, 11 are in a data transmission coupling via a data transmission path 10 directly between a non-illustrated antenna of the control device 6 and a non-illustrated antenna of the control device 16. The first cleaning vehicle 1 has sensors 22, by means of which the first cleaning vehicle 1 finds its position in the room and by means of which obstacles as well as the floor surface can be recognized.

The second cleaning vehicle 11 can also encompass sensor elements 23. In particular, this is a distance sensor, by means of which the second cleaning vehicle 11 can follow the first cleaning vehicle 1 at a fixed distance.

Position data, data relating to obstacles and data relating to the type of the floor surface can be transmitted from the first cleaning vehicle 1 to the second cleaning vehicle 11 via the data transmission path 10. For example, the second cleaning vehicle 11 is thus able to deactivate the cleaning device 13, 14, 15, thus lift it, for example, if it is to move across a floor surface, which is not to be wet-cleaned, for example a carpet. However, provision is also made for a temporary separation of the first cleaning vehicle 1, thus of the lead vehicle, from the second cleaning vehicle 11, thus the consecutive vehicle, to take place in such a case. After a treatment phase, in which the first cleaning vehicle 1 cleans a floor surface, which is to only be dry-cleaned and in which the second cleaning vehicle 11 carries out a treatment pause, the treatment vehicles 1, 11 can couple again.

As an alternative to the direct data communication of the two cleaning vehicles 1, 11 among one another, the exemplary embodiment illustrated in FIG. 3 shows a data communication via the data transmission paths 8, 9, in the case of which a base station 20 is used as relay station.

However, the combination of the two cleaning vehicles 1, 11 can also take place via an external wireless network, for example via an existing home network (WLAN or the like) by including the transmission protocols used there.

The two cleaning vehicles 1, 11 can control the base station 20 together. The outline thereof is thereby designed such that they are arranged next to one another without a significant distance. Provision is made in particular for the first cleaning vehicle 1 to dock directly on the base station 20 or, as is shown in FIG. 5, for the second cleaning vehicle 11 to dock directly on the base station 20 and for the first cleaning vehicle 1 to dock on the second cleaning vehicle 11. In response to docking, aids, such as retainers or a conveyor belt can be used. A docking positioning aid referring to this is described in DE 10 2013 104 399 and the entire content is included into the disclosure content of this application, also for the purpose of taking over individual features of this application text into the claims. If the cleaning vehicles 1, 11 come into contact with one another, as is roughly shown in FIG. 5, for example, the vehicle 1, which is arranged at a distance from the base station 20, can be supplied electrically with the help of the vehicle 11, which is docked directly on the base station. For this purpose, the cleaning vehicle 1 can be connected to the cleaning vehicle 11 via an electrical plug-in connection. The cleaning vehicle 11, in turn, is connected to the base station 20 via an electrical plug-in connection.

In a non-illustrated exemplary embodiment, the base station 20 has two docking spaces. One of the two cleaning vehicles 1, 11 can dock on each of the two docking spaces, so that the two cleaning vehicles 1, 11 can be supplied and cleaned independent from one another.

If the two cleaning vehicles 1, 11 dock on the base station 20 so as to be arranged behind one another, the base station can reach past the cleaning vehicle, which is docked directly on the base station 20, by means of an arm or the like, or can reach around the cleaning vehicle, which is docked directly on the base station 20, so as to come into mechanical and electrical contact with the spaced-apart cleaning vehicle.

The dust container 5 of the first cleaning vehicle 1 and the dirty water tank 18 of the second cleaning vehicle 11 is emptied via the base station. The fresh water tank 17 of the second cleaning vehicle 11 is filled up. The rechargeable batteries for the drives of the first cleaning vehicle 1 and of the second cleaning vehicle 11 are also recharged at the base station 20.

A floor cleaning, which is only carried out by the first cleaning vehicle 1, can be started from the parked position illustrated in FIG. 5. For this purpose, the second cleaning vehicle 11 remains at the base station 20. Starting at this parked position, it is also possible, however, for a combined dry-wet-cleaning to be carried out, in the case of which the first cleaning vehicle 1 moves across the treatment path 2, which is illustrated in FIG. 4, for example, and the second cleaning vehicle 11 follows the first cleaning vehicle 1 on a consecutive path 12 at a constant distance.

The above explanations serve to clarify the inventions, which are captured by the application as a whole, which further develop the state of the art at least by means of the following feature combinations, in each case independently, namely:

A floor cleaning device, which is characterized in that the second cleaning vehicle 11 follows the first cleaning vehicle 1 on the treatment path 2 thereof.

A floor cleaning device, which is characterized in that the second cleaning vehicle 11 is connected to the first cleaning vehicle 1 via an in particular releasable mechanical coupling 24.

A floor cleaning device, which is characterized in that the second cleaning vehicle 11 is mechanically unconnected to the first cleaning vehicle 1 and is in operative connection with the first cleaning vehicle via a data transmission path 8, 9, 10.

A floor cleaning device, which is characterized in that a cleaning device, in particular the first cleaning device 3, 4, is a dry cleaning device, for example a sweeping and/or suction device.

A floor cleaning device, which is characterizes in that one of the cleaning devices, in particular the second cleaning device 13, 14, 15, is a wet cleaning device, for example a mopping device or a combined suction-mopping device.

A floor cleaning device, which is characterized in that the second cleaning vehicle 11 is logically coupled to the first cleaning vehicle 1 via a direct data transmission path 10 or via an indirect data transmission path 8, 9, in particular via a base station 20.

A floor cleaning device, which is characterized in that a wireless data exchange takes place between the first cleaning vehicle 1 and the second cleaning vehicle 11 via a network protocol.

A method, which is characterized in that the first cleaning vehicle 1 transmits the control defaults and/or second control instructions to a control device 16 of the second cleaning vehicle 11 via a data transmission path 8, 9, 10, according to which control instructions the second cleaning vehicle 11 follows the first cleaning vehicle 1 on the treatment path 2 at least in sections and carries out a second cleaning step on its consecutive path 12.

A method or control program, which are characterized in that the second cleaning vehicle 11 follows the first cleaning vehicle 1 at a fixed distance.

A method or control program, which are characterized in that the control device 16 of the second cleaning vehicle 11 uses sensor data and/or position data and/or data relating to a driving strategy, which are obtained from at least one sensor 22 of the first cleaning vehicle 1.

A method or control program, which are characterized in that the second cleaning vehicle 11 follows the first cleaning vehicle 1 to a base station and docks on the base station 20.

LIST OF REFERENCE NUMBERS 1 first cleaning vehicle
2 treatment path
3 brush
4 suction channel
5 dust container
6 control device
7 chassis
8 data path
9 data path
10 data path
11 second cleaning vehicle
12 treatment path (consecutive path)
13 mopping device
14 wetting device
15 suction port
16 control device
17 fresh water tank
18 dirty water tank
19 chassis
20 base station
21 room
22 sensor
23 sensor
24 mechanical coupling

The invention claimed is:

1. A self-propelled floor cleaning device comprising:
    a manually controlled or program-controlled first cleaning vehicle, which moves across a treatment path across a surface, which is to be cleaned, the first cleaning vehicle comprising a first cleaner, a first chassis, and a first control device, and
    a second cleaning vehicle comprising a second cleaner, a second chassis, and a second control device,
    wherein the second cleaning vehicle is coupled to the first cleaning vehicle such that the second cleaning vehicle follows the first cleaning vehicle on the treatment path thereof,
    wherein
        the second cleaning vehicle is connected to the first cleaning vehicle via a releasable mechanical coupling, and/or
        the second cleaning vehicle is logically coupled to the first cleaning vehicle via a direct data transmission path or via an indirect data transmission path,
    wherein the first control device is separate from the second control device,
    wherein the first control device is configured to generate control instructions for the first vehicle and for the second vehicle, and
    wherein the second control device is configured to generate control instructions for the second vehicle.

2. The floor cleaning device according to claim 1, wherein the second cleaning vehicle is mechanically unconnected to the first cleaning vehicle and is in operative connection with the first cleaning vehicle via a data transmission path.

3. The floor cleaning device according to claim 1, wherein at least one of the first cleaner and the second cleaner is a dry cleaner.

4. The floor cleaning device according to claim 1, wherein at least one of the first cleaner and the second cleaner is a wet cleaner.

5. The floor cleaning device according to claim 1, wherein a wireless data exchange takes place between the first cleaning vehicle and the second cleaning vehicle via a network protocol.

6. A method for operating a self-propelled floor cleaning device according to claim 1, the method comprising steps of:
    preparing via the first control device of the first cleaning vehicle first control instructions from control defaults,
    moving the first cleaning vehicle across a treatment path according to the first control instructions,
    carrying out via the first cleaning vehicle a first cleaning step on the treatment path according to the first control instructions,
    transmitting from the first cleaning vehicle the control defaults and/or second control instructions to the second control device of the second cleaning vehicle via a data transmission path,
    following via the second cleaning vehicle the first cleaning vehicle on the treatment path according to the transmitted control defaults and/or the transmitted second control instructions, and
    carrying out a second cleaning step via the second cleaning vehicle on a path of the second cleaning vehicle and according to the transmitted control defaults and/or the transmitted second control instructions,
    wherein the second cleaning vehicle is connected to the first cleaning vehicle via a releasable mechanical coupling, wherein the second cleaning vehicle is logically coupled to the first cleaning vehicle via a direct data transmission path or via an indirect data transmission path, wherein the first control device is separate from the second control device, wherein the first control device is configured to generate control instructions for the first vehicle and for the second vehicle, and wherein the second control device is configured to generate control instructions for the second vehicle.

7. The method according to claim 6, wherein the second cleaning vehicle follows the first cleaning vehicle at a fixed distance.

8. The method according to claim 6, wherein the control device of the second cleaning vehicle uses sensor data and/or position data and/or data relating to a driving strategy, which are obtained from at least one sensor of the first cleaning vehicle.

9. The method according to claim 6, wherein the second cleaning vehicle follows the first cleaning vehicle to a base station and docks on the base station.

10. The floor cleaning device according to claim 3, wherein the dry cleaner comprises at least one of a brush and a suction port.

11. The floor cleaning device according to claim 4, wherein the wet cleaner comprises a mop.

12. The floor cleaning device according to claim 11, wherein the wet cleaner further comprises a suction port.

13. The floor cleaning device according to claim 1, wherein the cleaning device is configured to communicate with a base station, wherein the second cleaning vehicle is logically coupled to the first cleaning vehicle via an indirect data transmission path, and wherein the indirect data transmission path includes the base station.

* * * * *